(12) United States Patent
Horvath et al.

(10) Patent No.: US 11,381,519 B2
(45) Date of Patent: *Jul. 5, 2022

(54) SYSTEMS AND METHODS FOR ALLOCATING SHARED RESOURCES

(71) Applicant: The Toronto-Dominion Bank, Toronto (CA)

(72) Inventors: Peter Horvath, Toronto (CA); Gregory Richard Harper, Milton (CA); Richard Thomas, Bradford (CA); Tricia Elizabeth Allen, Toronto (CA); Joe Moghaizel, Toronto (CA); Aline da Rosa Alves, Toronto (CA); Lawrence Anthony Allen, Toronto (CA); Kimberly Elizabeth Lam, Toronto (CA); Min Shen, Toronto (CA); Melanie Judith Mendoza, Toronto (CA); Vanessa Li, Toronto (CA); Alexandra Antonucci, Burlington (CA); Audrey Madeleine Carr, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/100,255

(22) Filed: Nov. 20, 2020

(65) Prior Publication Data

US 2021/0075741 A1 Mar. 11, 2021

Related U.S. Application Data

(63) Continuation of application No. 16/254,738, filed on Jan. 23, 2019, now Pat. No. 10,873,542.

(Continued)

(51) Int. Cl.
*G06F 13/00* (2006.01)
*H04L 47/70* (2022.01)
(Continued)

(52) U.S. Cl.
CPC .......... *H04L 47/826* (2013.01); *G06Q 20/20* (2013.01); *G06Q 40/12* (2013.12)

(58) Field of Classification Search
CPC ... H04L 47/826; H04L 47/824; H04L 47/748; H04L 47/765; H04L 2012/5632; G06Q 40/12; G06Q 20/20; G06Q 20/206
(Continued)

(56) References Cited

U.S. PATENT DOCUMENTS 7,287,008 B1 10/2007 Mahoney et al.
8,606,695 B1 12/2013 Arora et al.
(Continued)

*Primary Examiner* — Kenneth R Coulter
(74) *Attorney, Agent, or Firm* — Rowand LLP

(57) ABSTRACT

Systems and methods for allocating resources. The system includes a communications module, a processor, and a memory. The memory stores a data record and instructions that, when executed, configure the processor to obtain a data record and transmit an existing score indication corresponding to the data record for display at the client device; receive a first time parameter and an action indicator associated with a shared resource and, in response, determine a first provisional score corresponding to the data record based on the existing score indication, the action indicator, and the first time parameter to provide a first provisional score indication; transmit the first provisional score indication and a selectable option associated with the action indicator for display at the client device while the first provisional score indication is displayed; and in response to receiving a resource transfer instruction, allocate the shared resource associated with the action indicator.

20 Claims, 10 Drawing Sheets

Related U.S. Application Data

(60) Provisional application No. 62/649,896, filed on Mar. 29, 2018.

(51) Int. Cl.
*G06Q 40/00* (2012.01)
*G06Q 20/20* (2012.01)

(58) Field of Classification Search
USPC ....... 709/226, 229, 201, 224, 223, 220–222; 715/751–759
See application file for complete search history.

(56) References Cited

U.S. PATENT DOCUMENTS

| | | |
|---|---|---|
| 9,569,797 B1 | 2/2017 | Rohn et al. |
| 10,725,610 B2 | 7/2020 | Bastide et al. |
| 10,739,938 B2 | 8/2020 | Bastide et al. |
| 10,873,542 B2 * | 12/2020 | Horvath ................ H04L 47/748 |
| 2010/0100424 A1 | 4/2010 | Buchanan et al. |
| 2013/0179806 A1 | 7/2013 | Bastide et al. |
| 2013/0191270 A1 | 7/2013 | Carragher |
| 2013/0227484 A1 | 8/2013 | Bastide et al. |
| 2013/0332341 A1 | 12/2013 | Papadimitriou |
| 2014/0156501 A1 | 6/2014 | Howe |
| 2014/0365354 A1 | 12/2014 | Shvarts |
| 2019/0306082 A1 | 10/2019 | Horvath et al. |

\* cited by examiner

SYSTEMS AND METHODS FOR
ALLOCATING SHARED RESOURCES

The present application is a continuation of U.S. application Ser. No. 16/254,738 filed Jan. 23, 2019 which claims priority to U.S. provisional application No. 62/649,896 (U.S. Pat. No. 10,873,542) filed on Mar. 29, 2018. The contents of these prior applications are hereby incorporated by reference in their entirety.

TECHNICAL FIELD

The present application relates to shared resources and, in particular, to systems and methods for allocating shared resources.

BACKGROUND

The concept of allocating shared resources finds application in a number of fields. For example, in the field of computer technology, shared resources can include shared processing resources, communication bandwidth, or data storage mediums, among other examples. Shared resources can also involve non-computing resources including consumable value, such as tokens or digital assets.

A resource supply entity can allocate resources to a borrowing entity and impose one or more allocation conditions in association with the allocated shared resources. Conditions can include, for example, duration of time that shared resource is allocated, cost to the borrowing entity for being allocated the shared resource, or the like. In scenarios where the borrowing entity fails to abide by the one or more conditions, the resource supply entity can be deprived of their access to the shared resources. Further, the resource supply entity may be less inclined to allocate shared resources to that particular borrower entity at a subsequent time.

To assist the resource supply entity with managing allocation of shared resources, it may be desirable to provide a measure of likelihood that a particular borrower entity may abide by one or more allocation conditions. In some examples, systems and methods are provided to generate an entity record and associate the entity record to the borrowing entity using an entity identifier. The entity record can include a score to be associated with that particular borrowing entity. The score can be based on data indicating whether the borrowing entity has historically abided by one or more conditions of previously allocated shared resources. In some examples, the score may be based on data indicating the overall quantity of shared resources currently being allocated to the borrowing entity or other like indicators. It can be appreciated that calculation of a score can be based, for example, on weighted factors and the weighted factors can be provided to algorithms or formulas to generate the score. Accordingly, a resource supply entity can determine whether to allocate shared resources to a particular borrowing entity based, at least in part, on the credit score associated with the borrowing entity at a particular point in time.

In some examples, the algorithms or formulas used for calculating the score can appear to be a "black box", where a borrowing entity may perceive the score calculation in terms of inputs and outputs without any knowledge of its internal workings.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
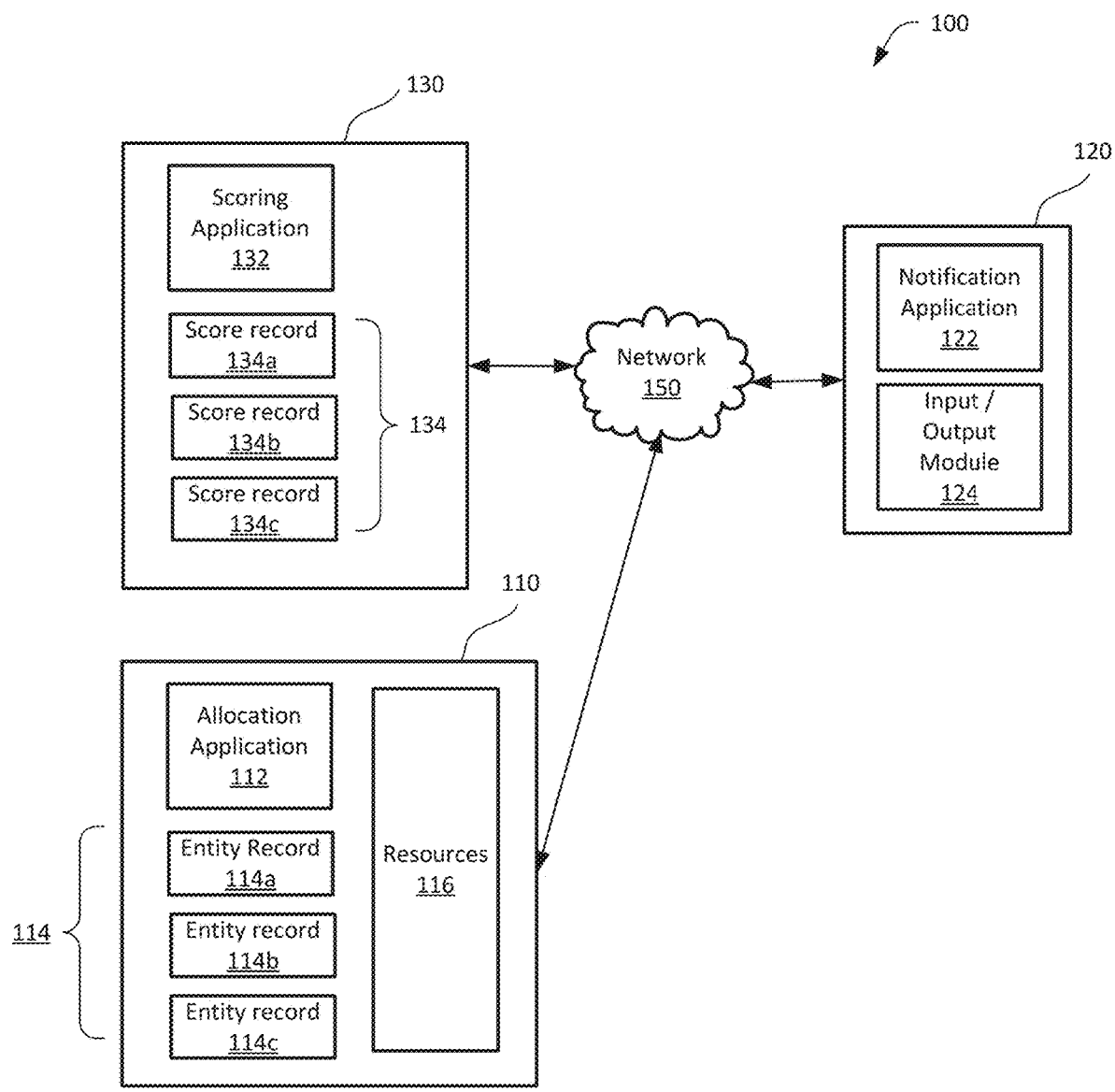
FIG. 1 illustrates, in block diagram form, a system for allocating shared resources, in accordance with an example of the present application.

In one aspect, the present application describes a system for allocating resources. The system comprises a communication module; a processor coupled to the communication module; and a memory coupled to the processor. The memory stores at least one data record and instructions that, when executed, configure the processor to: obtain a data record corresponding to an identifier and transmit, via the communication module to a notification application on a client device, an existing score indication corresponding to the data record for display at the client device; receive, via the communication module, a first time parameter and an action indicator associated with a shared resource and, in response, determine a first provisional score corresponding to the data record based on the existing score indication, the action indicator, and the first time parameter to provide a first provisional score indication; transmit, via the communication module to the client device, the first provisional score indication and a selectable option associated with the action indicator for display at the client device while the first provisional score indication is displayed; and in response to receiving a resource transfer instruction via the selectable option, allocate the shared resource associated with the action indicator.

In another aspect, the present application describes a computer-implemented method of allocating resources. The method includes: obtaining a data record corresponding to an identifier and transmitting, via a communication module to a notification application on a client device, an existing score indication corresponding to the data record for display at the client device; receiving, via the communication module, a first time parameter and an action indicator associated with a shared resource and, in response, determining a first provisional score corresponding to the data record based on the existing score indication, the action indicator, and the first time parameter to provide a first provisional score indication; transmitting, via the communication module to the client device, the first provisional score indication and a selectable option associated with the action indicator for display at the client device while the first provisional score indication is displayed; and in response to receiving a resource transfer instruction via the selectable option, allocating the shared resource associated with the action indicator.

In another aspect, a non-transitory computer-readable storage medium storing processor-executable instructions that, when executed, cause a processor to carry out the operations of one or more methods described herein.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Systems and methods can be provided for generated simulated scores based on simulated inputs received from the borrowing entity. As a non-limiting illustrating example, a resource supply entity may be a banking institution and the banking institution may offer loans having value, such as monetary currency, digital assets, or the like, to a borrowing entity based on a credit score associated with the borrowing entity. Systems and methods can be provided for providing a user interface for simulating the credit score associated with the borrowing entity. For instance, the user interface can be provided to receive input of simulated changes to variables such as: total number of open credit loans associated with the borrowing entity, total aggregate amount of credit extended to the borrowing entity, average temporal age of the credit accounts, number of credit accounts that have late payments in the past 6 months, or the number of credit inquiries associated with the borrowing entity. These systems and methods, however, require the borrowing entity to provide a "macro-level" summary of the state of pending shared resources currently allocated to the borrowing entity. For instance, the above described example requires the borrowing entity to provide desired changes to an overall summary of credit history (e.g., overall indication of number of accounts, overall indication of existing shared resource allocation, etc.).

However, given the importance accorded to a credit score associated with a borrowing entity, the borrowing entity may find it desirable to identify how a credit score associated with that borrowing entity can be impacted by particular future shared resource allocation. For example, the borrowing entity may find it desirable to understand how the credit score associated with the borrowing entity can change in response to providing "micro-level" input regarding a request for a shared resource allocation, such as a mortgage loan for a specific dollar amount having a specific term, etc.

Further, the borrowing entity may find it desirable to understand the impact of how multiple future shared resource allocation requests at specified future times can change the credit score associated with the borrowing entity. As an illustrating example, a borrowing entity may be contemplating two or more future requests for shared resource allocations, such as a mortgage loan and a vehicle purchase loan. In the present example, as the borrowing entity may prioritize a mortgage loan over the vehicle purchase loan, the borrowing entity may find it desirable to know in advance if the financial institution could refuse allocating a mortgage loan to the borrowing entity if the vehicle purchase loan were already allocated. Alternatively, the borrowing entity may find it desirable to know in advance whether the terms or conditions for the future mortgage could be less favourable if the vehicle purchase loan is provided prior to the future mortgage.

Further, as there may be several distinct resource supply entities that can offer shared resources, in some scenarios, the borrowing entity of the financial institution may find it desirable to determine, in real-time or near real-time, potential alternative shared resource allocations that may less significantly affect the credit score associated with the borrowing entity. For instance, as the borrowing entity may not be physically near the financial institution, it may be desirable for the borrowing entity to communicate with a resource allocation server of the financial institution and receive data or feedback in real-time or near real-time regarding potential shared resource allocations. As the borrowing entity may be associated with a computing device for communicating with the resource allocation server of the financial institution, the borrowing entity can request and receive shared resource allocation data from the resource allocation server from any location via a network communication channel.

The above provided non-limiting examples describe resource supply entities as financial institutions; however, it is understood that resource supply entities can also include shared computing resource suppliers for allocating cloud computing processing resources, data storage resources, communication network bandwidth resources, or the like. Borrowing entities can be client computing devices utilizing the shared computing resources based on one or more conditions for the allocation. A score can be associated with respective client computing devices and the resource supply entity can determine whether to allocate shared computing resources to the respective client computing devices based on the respective scores.

Reference is made to FIG. 1, which illustrates, in block diagram form, a system 100 for allocating shared resources, in accordance with an example of the present application. The system 100 can include a resource allocation server 110, a client device 120, and a data server 130.

The system 100 includes a network 150. The resource allocation server 110, the client device 120, and the data server 130 can be configured to communicate with any other device over the network 150 or with any other similar computing device. The network 150 can include a plurality of interconnected wired and wireless networks, including the Internet, wireless local area networks, wireless area networks, or the like.

The resource allocation server 110 can be a single server, multiple servers, a server farm, or any other such arrangement of computing devices to implement computing server-like functionality. The resource allocation server 110 includes one or more processors, memory, and a communication module for providing communications capability with other computing devices. As will be described, the resource allocation server 110 includes an allocation application 112 having processor executable instructions stored in memory that, when executed, cause a processor to conduct operations described herein for allocating shared resources.

The resource allocation server 110 includes one or more data records, such as entity records 114 (illustrated individually as 114a, 114b, 114c, etc.). An entity record may include data structures having information associated with a client device 120, where the client device 120 may be a computing device associated with a user or a borrowing entity.

The resource allocation server 110 includes resources 116 (shown as a single item in FIG. 1 for ease of illustration). Resources 116 may be added or removed from the resource allocation server 110. The resources 116 may be allocated to one or more entity records 114. That is, each entity record 114 may have a particular quantity of resources 116 allocated to it. Resources 116 may be added to or removed from association with an entity record according to operations of the resource allocation server 110, the client device 120, or any other device described herein. Associations between the allocated resources 116 and the entity records 114 may be stored by the resource allocation server 110.

Resources 116 can include, for example, computing resources such as processor cycles, processor time, memory, bandwidth, or the like. In some examples, the resources 116 can include other consumable value, such as tokens or digital assets. Tokens may represent any quantifiable thing, including money, credits, shares, cryptocurrency, time, precious metals, etc. As described, the resources 116 or a portion of resources can be associated with respective entity records 114 for consumption by a client device 120 associated with the entity record 114. The resources 116 can also be reallocated from one entity record to another entity record or to applications or processes external to the resource allocation server 110.

The client device 120 includes one or more processors, memory, and a communications module for providing network communications capabilities with other computing devices. In some examples, the client device 120 may be a mobile computing device associated with a user or borrowing entity. As an illustrating example, the resource allocation server 110 can be a banking institution server for managing client accounts associated with respective client devices. The client device 120 can include a notification application 122 having processor executable instructions that, when executed, cause a processor to connect with the resource allocation server 110. As a non-limiting illustrating example, the notification application 122 can be a mobile banking application for accessing or modifying entity records 114 stored at the resource allocation server 110.

The client device 120 can provide a user interface displayed via an input/output module 124 for a user to interact with the resource allocation server 110. For example, the input/output module 124 can include a touch screen display for displaying a user interface and a touch screen interface for receiving motion or touch input from the user of the client device 120. Other examples of input/output modules for displaying content to the user or for receiving input signals representing commands or selectable options from the user of the client device 120 are contemplated.

The client device 120 includes memory that stores the notification application 122. The notification application 122 includes processor readable instructions that, when executed, cause a processor to perform operations described herein. For instance, the notification application 122 can include processor executable instructions for displaying information to a user of the client device 120 and for receiving input from the user of the client device 120. For example, as described herein, the notification application 122 can provide a user interface for receiving action indicators associated with shared resources or time parameters. Action indicators associated with shared resources can include graphical icon input or alphanumeric input for receiving details associated with contemplated future shared resource allocation requests. Time parameters can also include graphical icon input or alphanumeric input for receiving details regarding future shared resource allocation requests. Although one client device 120 is illustrated in FIG. 1, the system 100 can include any number of client devices 120 for interacting with the resource allocation server 110.

The data server 130 can include a scoring application 132 and one or more score records 134 (illustrated individually as 134a, 134b, 134c, etc.). The scoring application 132 can include processor executable instructions stored in memory that, when executed, cause a processor to determine a score indication associated with one or more score records. In some examples, respective score records 134 may correspond to an entity record 114 at the resource allocation server 110. In some examples, a score stored in a score record may be based on data indicating whether a borrowing entity had historically abided by one or more conditions for shared resource allocation, or other like indicators. The data server 130 can transmit score indications stored in the plurality of score records 134 to the resource allocation server 110 and, subsequently, the resource allocation server 110 can determine allocation of shared resources to borrowing entities associated with the entity records 114 based on the score indications.

As a non-limiting illustrating example, in the retail banking industry, the data server 130 can be a credit reporting agency server that collects and compiles information regarding credit history from financial institutions and various other bodies such as courthouses and the Office of the Superintendent of Bankruptcy. That is, the data server 130 can conduct operations for generating credit scores for various borrower entities. In another illustrating example, the data server 130 can be an administration server for a ride-sharing or accommodation-sharing industry that collects and compiles information regarding ratings and information regarding client devices and associated borrowing entities. Thus, the data server 130 can conduct operations for generating scores for various borrowing entities to facilitate allocation of the shared resources.

In some examples, the data server 130 can be implemented apart from the resource allocation server 110. That is, the data server 130 may be a third party server of a separate organization. However, in some examples, the resource allocation server 110 and the data server can be included in a single computing server device executing the methods described herein.

Figure 2:
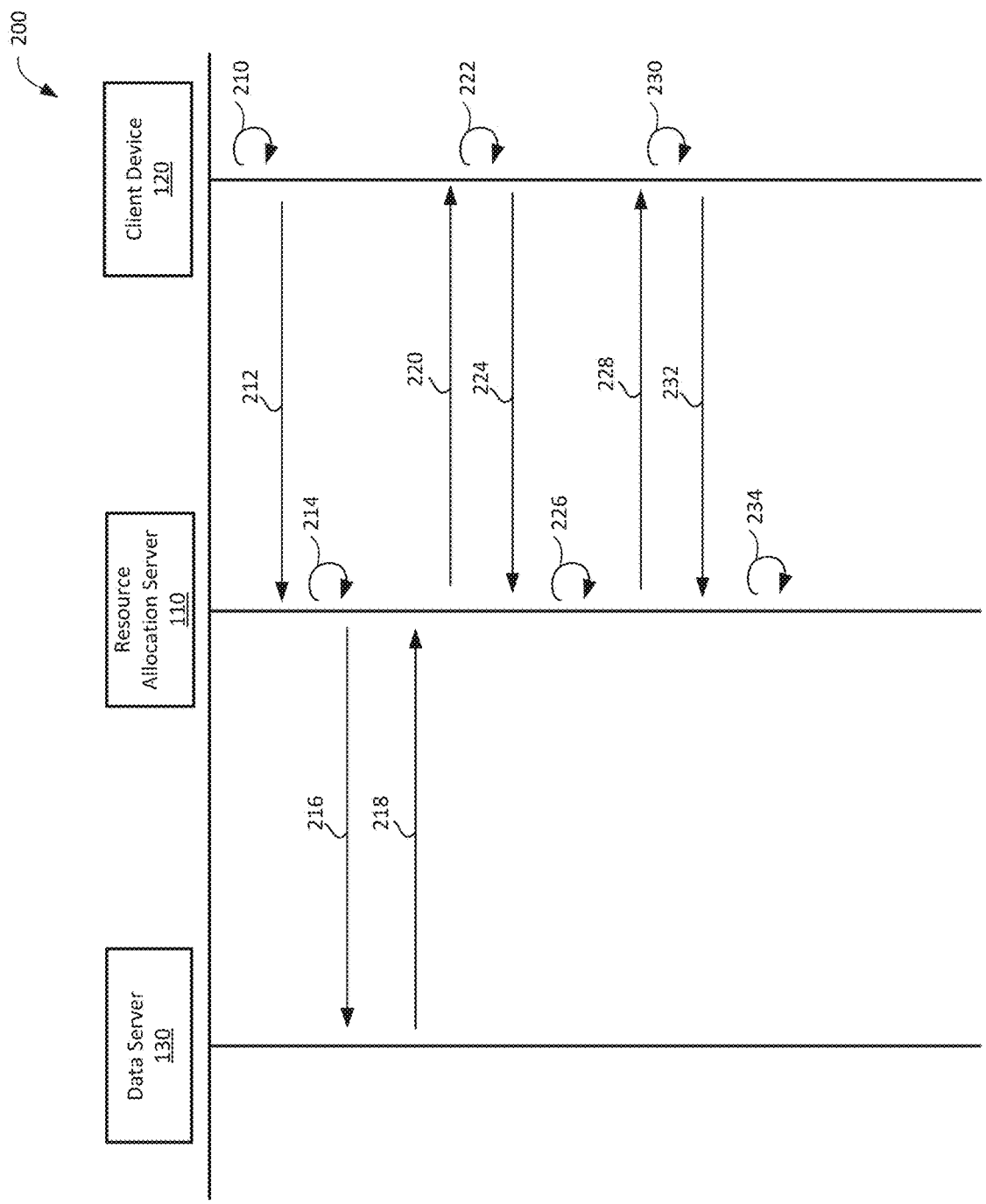
FIG. 2 illustrates a signal diagram illustrating exchanges among computing devices for allocating shared resources, in accordance with an example of the present application.

Reference is made to FIG. 2, which illustrates a signal diagram 200 illustrating exchanges among computing devices for allocating shared resources, in accordance with an example of the present application. FIG. 2 includes the example resource allocation server 110, the client device 120, and the data server 130 of FIG. 1.

To highlight features described herein, the resource allocation server 110 can be a computing server for an organization such as a banking institution and the data server 130 can be a computing server for a third-party entity such as a credit reporting agency. It will be understood that the resource allocation server 110 can be a computing server for any other type of organization, such as a cloud computing resource sharing organization, ride-sharing organization, a temporary accommodation-sharing organization, or any other goods or services organization. Further, it will be understood that the data server 130 can be a computing server for collecting and compiling entity rating information, such as experience satisfaction or user compliance data that is associated with entities associated with the client device 120. The entity records 114 (FIG. 1) can be data records associated with respective client devices, where each entity record is associated with an entity identifier. The entity identifier can be associated with a user of the client device 120. In some examples, the resource allocation server 110 can associate respective client devices with particular entity records 114 and/or score records 134.

The signal diagram 200 illustrates operations that may be implemented, at least in part, through processor executable instructions stored at the respective devices or servers. The operations may be carried out by one or more processors of the respective devices, servers, or applications thereon.

At operation 210, the client device 120 can display a user interface. Continuing with the example above, the user interface can be a mobile banking application displayed by the input/output module 124 of the client device 120 for accessing the resource allocation server 110. For example, the client device 120 may be associated with a banking client and the client device 120 may display a user interface configured to allow the banking client to access an entity record 114. The user interface may receive an input signal via the input/output module 124 (FIG. 1) representing a client request for an existing score indication, such as an existing credit score indication. Given the importance accorded to a credit score, for example, that is associated with the banking client (e.g., borrowing entity), the request for the existing score indication may be a mobile banking application feature for allowing the banking client (e.g., borrowing entity) to understand the likelihood that the banking client may be allocated shared resources in the future.

At operation 212, the client device 120 transmits the request to retrieve an existing score indication corresponding to the entity record associated with the banking client.

At operation 214, the resource allocation server 110 obtains an entity record 114 corresponding to an entity identifier and, subsequently at operation 216, transmits, to the data server 130, a request to query the score records 134. For example, the resource allocation server 110 may retrieve the entity record 114 stored in memory. Further, the data server 130 may be a credit reporting agency server for collecting and compiling information regarding banking clients from various sources. The request to query the score records 134 may include an entity identifier for identifying one or more scoring records 134 associated with the banking client. The entity identifier can be associated with the client device 120 or the particular banking client using the client device 120.

In some examples, the request to the data server 130 may also include a request for score records 134 associated with demographic criteria, such as geographical region, family unit information, or the like. The score indications or score records 134 associated with particular demographic criteria may be utilized for determining scores based on aggregated score records associated with demographic criteria. That is, the resource allocation server 110 may conduct statistical analysis relating to aggregate data regarding a demographic group (e.g., geographical location of client device 120, average usage of shared resource allocation, etc.) and determine provisional scores.

At operation 218, the resource allocation server 110 may receive the requested score records 134 and, in response, determine an existing score indication corresponding to the entity record associated with the entity identifier. The existing score indication may be a score indication at a given point in time. For instance, the existing score indication may be based on or indicative of existing resource allocations associated with the entity record. The existing score indication may be based on the data up to a given point in time relating to whether the borrowing entity associated with the entity record has historically abided by one or more conditions of previously allocated shared resources. To illustrate, the resource allocation server 110 may determine a score, such as a credit score, associated with the banking client using the client device 120 based on a scoring model. The scoring model may include a weighted sum of factors that determine a score indication for a particular entity record 114. Factors can include how long the entity record has been existence (e.g., how much data has been captured in the entity record), whether previously allocated shared resources were reverted back to a prior resource supply entity in accordance with one or more conditions (e.g., borrowing entity abided by conditions), the quantitative amount of shared resources currently associated or allocated to the entity record, or other like factors. In some examples, these factors can affect the determination of the existing score indication. For example, where a borrowing entity had historically not reverted allocated shared resources back to resource supply entities according to the one or more conditions, the existing score indication may be lower than another score indication associated with a borrowing entity that has historically reverted allocated shared resources back to resource supply entities. Further, some factors may affect the quantitative score more than other factors. For instance, the factor of the amount of shared resources allocated may affect the score indication to a lesser degree than the factor of whether a borrowing entity previously abided by one or more conditions imposed on prior shared resource allocations.

At operation 220, the resource allocation server 110 transmits, via the communication module to the notification application 122 on the client device 120, an existing score indication and the client device 120 may display the existing score indication on a display for a user of the client device 120.

At operation 222, the client device 120 receives input including a time parameter and an action indicator associated with a shared resource and, subsequently at operation 224, transmits a signal representing the time parameter and action indicator associated with the shared resource to the resource allocation server 110.

The action indicator may be a graphical icon input or alphanumeric input indicating a contemplated request for a shared resource allocation. The graphical icon input can be a signal representing selection of a graphical icon associated with a shared resource, such as a mortgage loan. In some examples, the action indicator may include input regarding a specific mortgage amount requested, mortgage term requested, or the like. Further, the time parameter may be a graphical icon input or alphanumeric input indicating a future time or time range. Accordingly, the combination of the received action indicator and the time parameter can represent a specific request for shared resource allocation. The combination of the time parameter and the action indicator summarizes the banking client intention for requesting shared resources at a future time.

In response to receiving the first time parameter and the first action indicator, at operation 226, the resource allocation server 110 determines a first provisional score corresponding to the entity record 114 (e.g., entity record associated with the user identifier) based on the existing score indication, the action indicator, and the first time parameter to provide a first provisional score. As described herein, the resource allocation server 110 can determine the first provisional score such that the first provisional score can be provided in real-time (or near real-time) to the client device 120. The client device 120 may be at a location away from the resource allocation server 110 (e.g., bank branch). Thus, a user of the client device 120 can be provided with remote and near real-time access to provisional score data that may impact requests for shared resource allocations (e.g., requests for monetary loans).

Continuing with the above example, if the existing score indication includes a credit score value of "800", the resource allocation server 110 can determine an estimated change in the credit score value if the allocation application 112 was to allocate the requested mortgage loan resources to the entity record 114 associated with the user identifier. That is, the first provisional score can provide a forward-looking estimate of how the score indication associated with the entity record 114 may change based on the requested shared resource. As described, given the importance accorded to a score indication with respect to what shared resources may be allocated to a banking client, providing a forward-looking estimate of how the score indication may change based on particular time parameter input and shared resource allocation detail can assist the banking client with determining whether to make a particular request for shared resources.

At operation 228, the resource allocation server 110 transmits, to the client device 120, the first provisional score indication and a selectable option associated with the action indicator for display at the client device 120 while the first provisional score indication is displayed. For example, the selectable option may be a selectable graphical icon for receiving input for confirming the request for shared resource allocation. For instance, the previously requested shared resource allocation may be the requested mortgage loan request exemplified at operation 222. The client device 120 may receive and display, on the user interface, the first provisional score and the selectable option, where the selectable option can be a graphical icon or alphanumeric input option for receiving input that confirms the request for the mortgage loan (e.g., example provided above at operation 222). The selectable option can be displayed at the client device 120 while the first provisional score indication is displayed.

At operation 230, the client device 120 can receive a resource transfer instruction via the displayed selectable option. In some examples, the selectable option can be a graphical icon, a text box requiring confirmatory input text, or the like. For example, after considering the displayed first provisional score indication, the banking client associated with the client device 120 may decide that the banking client is comfortable with the estimated credit score change and can provide input at the displayed selectable option. The input via the displayed selectable option may be a resource transfer instruction. The client device 120 subsequently transmits, to the resource allocation server 110, the signal representing the resource transfer instruction At operation 232, the resource allocation server 110 receives the resource transfer instruction from the client device 120 and, subsequently at operation 234, the allocation application 112 (e.g., at the resource allocation server 110) can allocate the shared resource associated with the action indicator by associating the shared resource to the entity record associated with the banking client. Based on the above example, the borrowing entity may receive an estimated indication on how a credit score might change in response to receiving a future shared resource allocation and, subsequently, provide a resource transfer instruction if desired.

Figure 3:
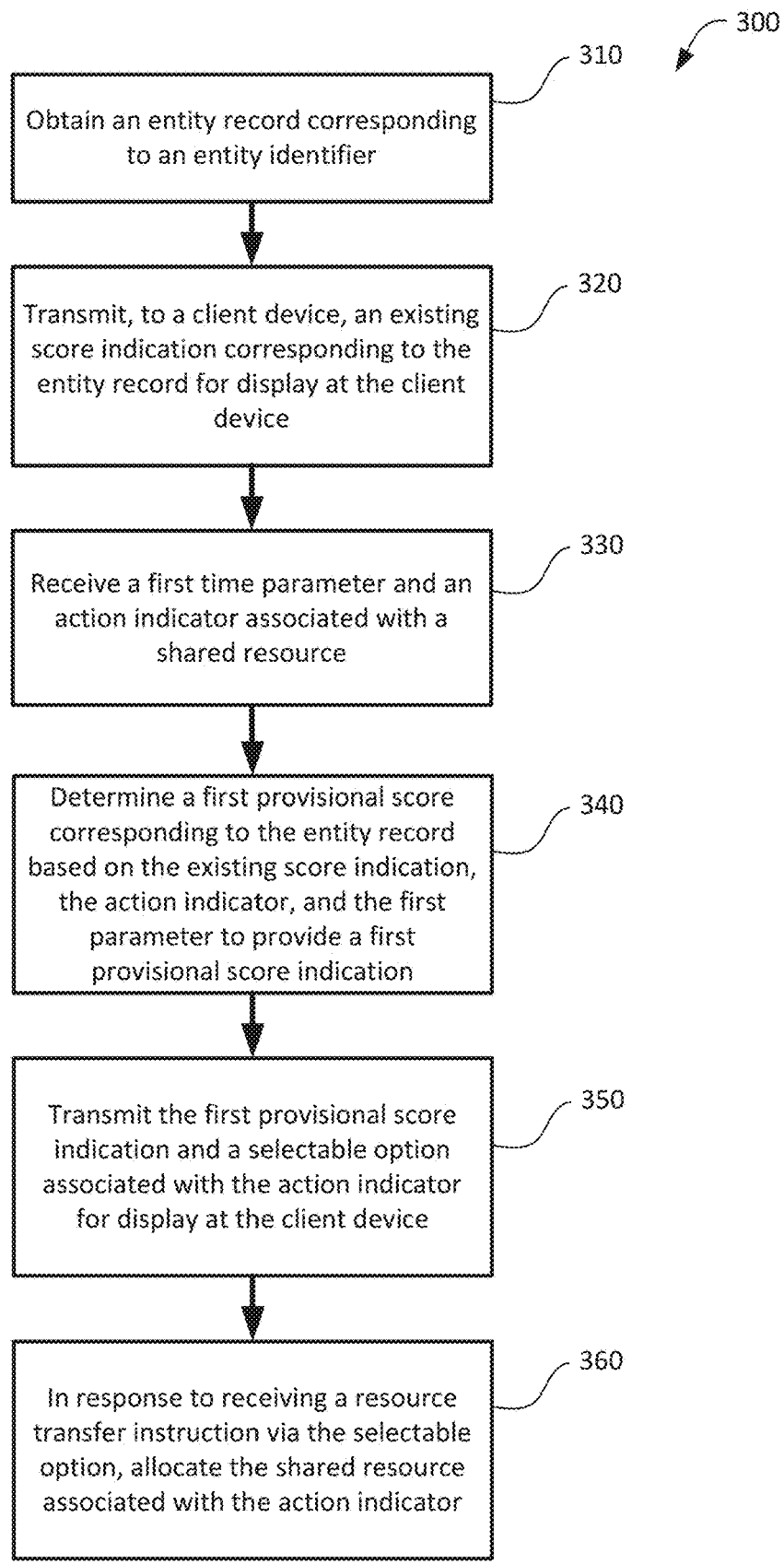
FIG. 3 illustrates, in flowchart form, a method of allocating shared resources, in accordance with an example of the present application.

Reference is made to FIG. 3, which illustrates, in flowchart form, a method 300 of allocating shared resources by the resource allocation server 110 (FIG. 1), in accordance with an example of the present application. The method 300 includes operations that may be carried out by one or more processors of the resource allocation server 110. For example, the method 300 can be implemented, at least in part, through processor executable instructions associated with the allocation application 112 (FIG. 1). In some examples, one or more operations may be implemented via processor executable instructions in other applications or in an operation system stored and executed on the resource allocation server 110.

At operation 310, the processor obtains an entity record 114 corresponding to an entity identifier and transmits, at operation 320 via a communication module to a notification application 122 on a client device 120, an existing score indication corresponding to the entity record 114 for display at the client device 120. As an illustrating example, the entity record 114 can be a bank account record stored at the resource allocation server 110. The resource allocation server 110 can be an accounts server at a banking institution. It will be understood that the present example for highlighting features of method 300 is directed to allocating monetary value at a banking institution; however, other types of shared resources are contemplated.

Further, the client device 120 can be a mobile computing device associated with a banking client. The notification application 122 can be a mobile banking application and a banking client can provide input, via input interfaces, to the notification application 122 for interacting with the resource allocation server 110. In the present example, the existing score indication may be a credit score associated with the banking client's entity record 114. As described, the credit score can be based on data indicating whether the borrowing entity has historically abided by one or more conditions of previously allocated shared resources. In some examples, the credit score can provide an indication of a banking client's capacity to repay or return a shared resource (e.g., a monetary loan or other value loan). It can be understood that the existing score indication can be any other quantitative or quasi-quantitative score for assisting a resource supply entity with managing allocation of shared resources. For example, score indications can provide information to a resource supply entity to assist with determining whether to allocate shared resources or in what quantity to allocate shared resources. In some examples, the score indication can dynamically change in response to new circumstances associated with the borrowing entity. Accordingly, given the importance accorded to a score indication associated with a borrowing entity or a client device 120, it may be desirable to periodically provide an existing score indication for display at a client device 120.

In some examples, the score indication may be alphanumeric text. In some other examples, the score indication may be graphically provided in the form of a dial meter icon, where positioned pointers on the dial meter icon illustrates the score indication. In some other examples, the score indication may be provided on a linear scale or any other pictorial form.

At operation 330, the processor can receive, via the communication module, a first time parameter and an action indicator associated with a shared resource. The action indicator can indicate the banking client's interest in requesting shared resources for an upcoming event (e.g., line-of-credit for a vehicle purchase). In some examples, the action indicator can include alphanumeric input indicating the quantity of shared resources requested (e.g., amount of money), the requested loan term (e.g., time duration of 48 months), or the like. Further, the first time parameter can indicate a projected time which the banking client may wish to draw on the shared resources. For instance, the banking client may have signed a new vehicle purchase agreement and may require monetary funds in 4 weeks when the new vehicle is ready for pick-up.

In some examples, the action indicator can indicate a request for a new shared resource allocation. For instance, new shared resource allocation may be a new line-of-credit loan. In some other examples, the action indicator can include a request for varying allocation of an existing shared resource. For instance, the entity record 114 associated with the banking client may already be associated with a credit card account and the action indicator can include a request for increasing a credit limit of the credit card account. Other examples of varying allocation of an existing shared resource can be contemplated.

At operation 340, the processor determines a first provisional score corresponding to the entity record based on the existing score indication, the action indicator, and the first time parameter to provide a first provisional score indication. The first provisional score can be a simulated credit score associated with the entity record (e.g., of the banking client). The simulated credit score can be based on what the existing credit score is (e.g., as of today's date). Further, because credit scores can be time dependent measures, the simulated credit score can be based on the received first time parameter. For instance, credit scores can improve (e.g., increase) over time if the borrowing entity does not seek additional shared resources (e.g., loans) and continues to abide by conditions (e.g., payment due dates, etc.) of existing shared resource allocations (e.g., loans). Thus, the simulated credit score may change more drastically if a first time parameter indicates a time in the near future as compared to if the first time parameter indicates a time several months away. Further, the credit score can be based on the magnitude of the shared resource allocation being sought. For example, the simulated credit score may change more drastically if a large mortgage loan (e.g., $800,000) is sought, whereas the simulated credit score may change less drastically if a new vehicle purchase loan (e.g., $20,000) is sought.

As an illustrative example, if the existing credit score for a borrowing entity was "800" and if the simulated credit score were to be determined based on the quantity of shared resource being requested, the simulated credit score may be decreased based on increments of shared resource being sought. For example, the simulation may involve decreasing a credit score by 5 points for every $20,000 loan being sought. In this example, the simulated credit score associated with an $800,000 loan request may be "600", whereas the simulated credit score associated with a $20,000 loan request may be "795". It can be appreciated that the above method for determining a simulated credit score is only illustrative and that the simulated credit score can be determined via any other operations or based on a combination of criteria or factors.

At operation 350, the processor transmits, via the communication module to the client device 120, the first provisional score indication and a selectable option associated with the action indicator for display at the client device 120 while the first provisional score indication is displayed. While the first provisional score indication is displayed, the banking client associated with the client device 120 can evaluate whether it may be desirable to confirm request of the shared resource allocation (e.g., line-of-credit loan for new vehicle purchase) in view of the simulated credit score indication. The selectable option can include user interface features for receiving confirmation that the banking client desires to request the shared resource allocation, in view of the simulated credit score indication.

In some examples, prior to transmitting the first provisional score indication and the selectable option associated with the action indicator for display at the client device 120, the processor can determine whether it would be desirable to allocate any shared resource to an entity record associated with the client device 120. Given the importance accorded to a credit score when determining whether to allocate a shared resource to a borrowing entity, the processor can determine whether the provisional score indication would be greater than a threshold score. In some examples, the threshold score can be a threshold separating a "good" score and an "excellent" score. In the scenario where the first provisional score is greater than the minimum threshold score, the processor can transmit the first provisional score indication and the selectable option associated with the action indicator for display at the remote device (e.g., at operation 350).

If the processor determines that the first provisional score is less than the minimum threshold score, the resource allocation server 110 may determine that it is not desirable to allocate shared resources to the entity record 114 associated with the subject banking client (e.g., credit risk or the like). In the scenario that the processor determines that the first provisional score is less than the minimum threshold score, the processor can transmit a notification message to the client device 120 informing the client device 120 that the requested resource allocation will not be provided. In another example, the processor can transmit a notification message to the client device 120 informing the client device 120 that alternate shared resource allocations may be made, in view of credit risk or the like. For instance, the alternate shared resource allocation can include a reduced shared resource allocation or allocation of another shared resource allocation type.

As described above, a resource transfer instruction may be transmitted from the client device 120 to the resource allocation server 110 (e.g., operation 230). That is, the resource transfer instruction may be received from the client device 120. In response to receiving the resource transfer instruction, the processor at operation 360 allocates the shared resource associated with the action indicator. In the present example, the received resource transfer instruction can include a confirmation that the banking client requests the shared resource allocation. Accordingly, the processor can allocate monetary value associated with a line-of-credit loan with an entity record 114 that corresponds to the banking client.

Examples described herein provide systems and methods for receiving input from the client device 120 associated with requests of shared resource allocations by borrower entities. In some following examples (e.g., corresponding to method 400 of FIG. 4), it may be desirable for the resource allocation server 110 to determine whether alternate shared resource allocation arrangements can be provided to achieve similar shared resource requirements as the received request of shared resource allocation by the borrower entity. For instance, the resource allocation server 110 may receive the action indicator and the first time parameter for indicating a line-of-credit loan for purchase of a vehicle valued at $15,000 in 4 weeks when the new vehicle is ready for pick-up. In some scenarios, an existing credit score may not change as drastically in response to a request to vary allocation of an existing shared resource as compared to a request for a new shared resource allocation. That is, the existing credit score may experience a small change when requesting a credit increase on an existing credit account, whereas the existing credit score may experience a relatively larger change when requesting a new credit account. Thus, it may be desirable to provide a resource allocation server 110 to evaluate alternate shared resource arrangements.

Figure 4:
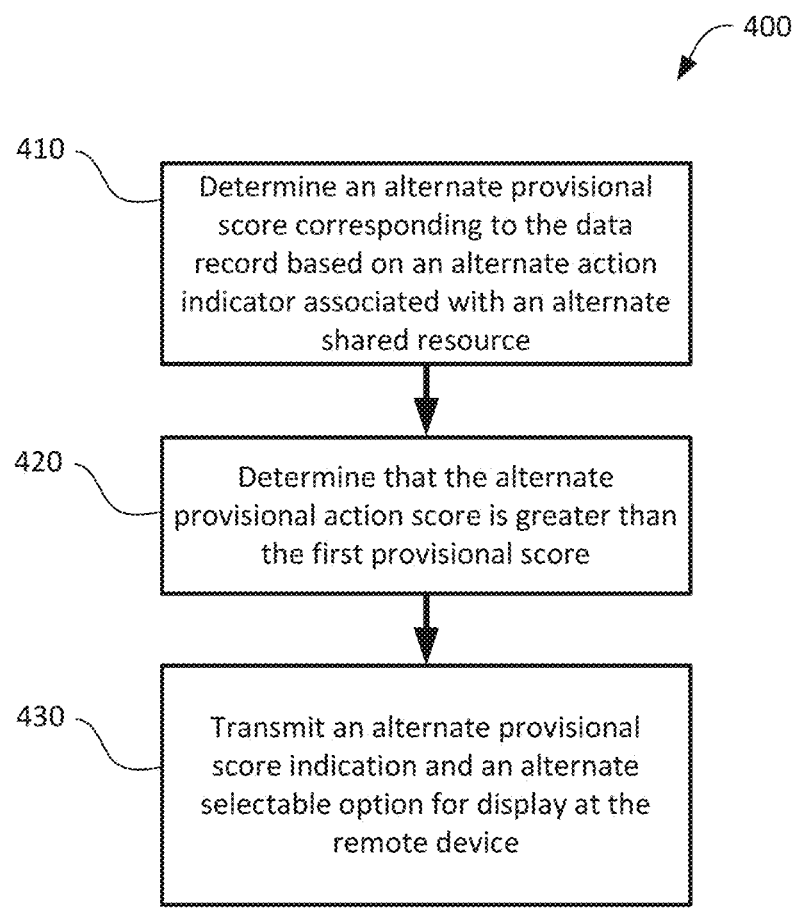
FIG. 4 illustrates, in flowchart form, a method of allocating shared resources, in accordance with another example of the present application.

Reference is made to FIG. 4, which illustrates, in flowchart form, a method 400 of allocating shared resources by a resource allocation server 110 (FIG. 1), in accordance with an example of the present application. The method 400 includes operations that may be carried out by one or more processors of the resource allocation server 110. For example, the method 400 can be implemented, at least in part, through processor-executable instructions associated with the allocation application 112 (FIG. 1). In some examples, one or more of the operations may be implemented via processor-executable instructions in other applications or in an operating system stored and executed on the resource allocation server 110.

In some examples, the processor may perform the operations of the method 400 substantially simultaneously with the operations of the method 300 in FIG. 3. For example, in response to receiving the first time parameter and the action indicator associated with a shared resource (e.g., operation 330 in FIG. 3), the processor can perform the operations of method 400 in FIG. 4 for determining alternate shared resource arrangements to achieve similar resource allocation results as the request received at operation 330 in FIG. 3.

At operation 410, the processor determines an alternate provisional score corresponding to the entity record based on an alternate action indicator associated with an alternate shared resource. In the above described example, the shared resource allocation request included a request for a line-of-credit loan. In the present example, an alternate action indicator can be associated with a credit account other than a line-of-credit account.

For example, the alternate shared resource may be an existing home equity line of credit (HELOC) that is already allocated to the entity record 114. As suggested above, rather than requesting a new line-of-credit account, the existing HELOC account may be suitable for providing shared resources (e.g. monetary funds) for purchasing the new vehicle. Thus, the processor at operation 410 can determine an alternate provisional credit score corresponding to a request for varying the existing HELOC account conditions. It can be appreciated that the alternate shared resource may be a request for a different shared resource. For instance, the alternate shared resource may be a request for a cash advance loan. Thus, the processor at operation 410 can determine the alternate provisional credit score corresponding to the request for the new cash advance loan.

At operation 420, the processor can determine whether the alternate provisional score is greater than the first provisional score. For instance, if the first provisional score is "750" (e.g., associated with request for line-of-credit loan discussed with FIG. 3) and if the alternate provisional score is "780" (e.g., associated with request for varying an existing HELOC account), the processor can determine that the alternate provisional score of "780" is greater than the first provisional score of "750".

In response to determining that the alternate provisional score is greater than the first provisional score, the processor at operation 430 transmits an alternate provisional score indication and an alternate selectable option associated with the alternate selectable option for display at the client device 120. The alternate selectable option can be a selectable graphical icon or an alphanumeric input feature for receiving input for confirming the request for the alternate shared resource (e.g., varying existing HELOC account). By transmitting both the alternate provisional score indication and the prior determined first provisional score indication, the resource allocation server 110 can provide one or more alternate shared resource options for display at the client device 120. That is, the client device 120 can display both: (a) the first provisional score indication associated with the corresponding shared resource request (e.g., from operation 330) and (b) the alternate provisional score indication associated with the corresponding alternate shared resource (e.g., from operation 430). In some examples, the alternate shared resource options can include shared resource allocation options that the banking client may not have considered but, if selected, could be result in a more favorable score.

Examples described herein include the processor receiving input from the client device 120, including time parameters for indicating a future time associated with a shared resource allocation request. In some examples, an intended date for resource allocation may affect the determination of a score indication associated with an entity record. For instance, allocating a shared resource to a banking client today may result in a provisional score indication that is different than another provisional score resulting from allocating the same shared resource 9 months from today. Thus, it may be desirable to provide a time-varied provisional score indicator at an alternate time that is different than the time associated with the first time parameter. To illustrate, the first time parameter may indicate a time 4 weeks from today. The alternate time may be 8 weeks from today. Thus, in some examples, the processor can provide alternate provisional score indications associated with different dates for shared resource allocation. In scenarios where the banking client may be flexible on when the shared resource is needed, the banking client may elect to receive shared resources for purchasing a new vehicle 8 weeks from today with lesser change in credit score rather than electing to receive shared resources for purchasing the new vehicle 4 weeks from today. Thus, it may be also desirable to provide time-varied alternate provisional scores for illustrating a potentially optimal date for allocating shared resources.

Figure 5:
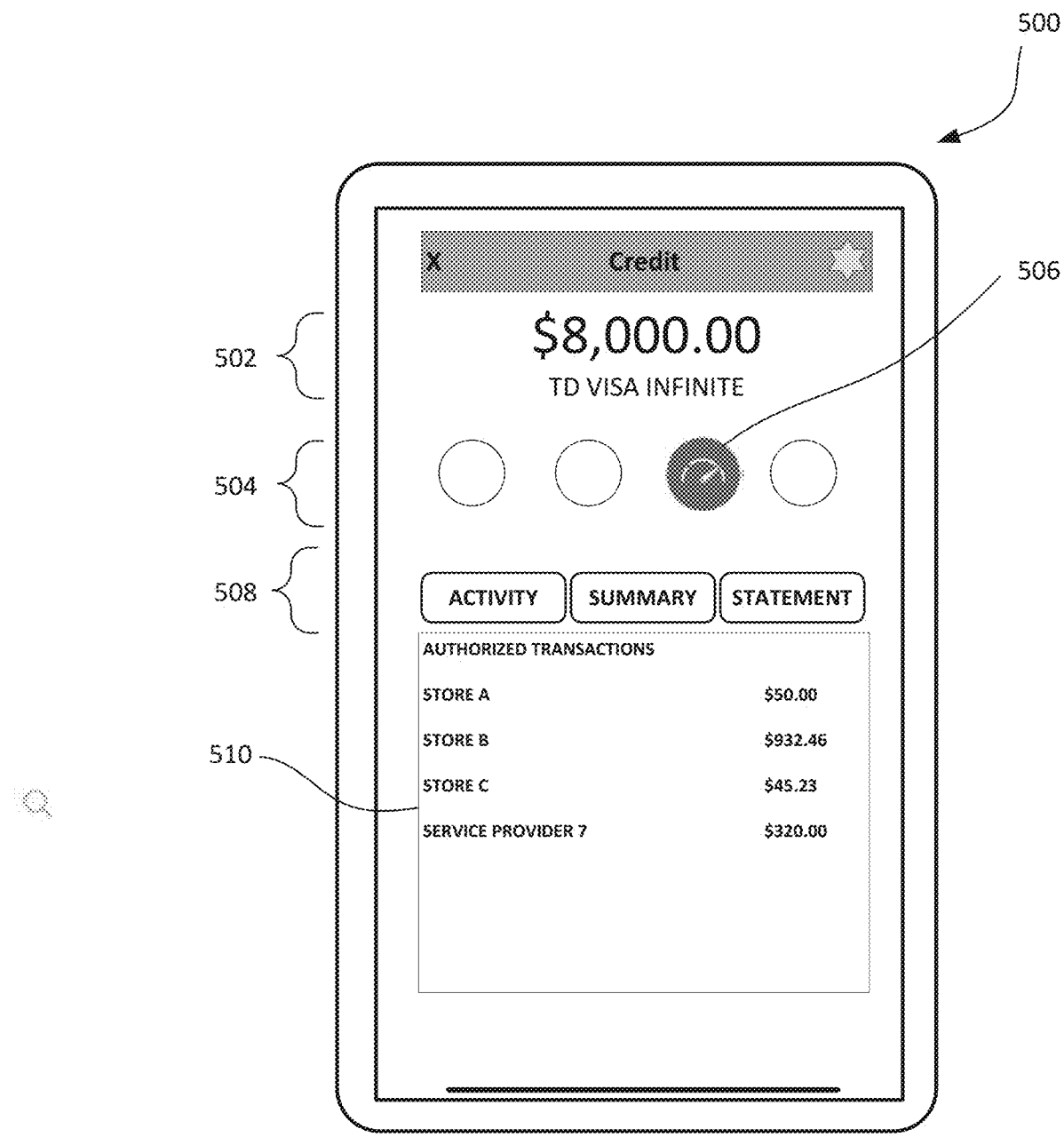
FIG. 5 illustrates a user interface for communicating with a resource allocation server, in accordance with an example of the present application.

Reference is made to FIG. 5, which diagrammatically illustrates a user interface 500, in accordance with an example of the present application. The user interface 500 may be based on an example mobile banking application provided by a notification application 122 at the client device 120 (FIG. 1). The user interface 500 illustrates a quick-reference section 502 for identifying that the credit card account is a "TD VISA™ INFINITE" and that the account balance is currently $8,000. In some examples, displaying the user interface 500 corresponds to operation 210 in FIG. 2.

The user interface 500 can include selectable icons 504 for receiving input action requests at the client device 120. For example, selectable icons 504 can include icons for accessing interfaces for payment actions, reward point balances, or other credit action options.

In FIG. 5, the selectable icons 504 include a score indication icon 506 for advancing to subsequent user interface screens for retrieving credit score indications and allocating shared resources. The score indication icon 506 can be used for receiving an input signal via the input/output module 124 (FIG. 1) representing a request for an existing credit score indication. As described, given the importance accorded to a credit score, the request for the existing score indication may be a mobile application feature for allowing the banking client (e.g., borrowing entity) to understand the likelihood that the banking client may be allocated shared resources in the future.

The user interface 500 can also include information selection tabs 508 for accessing various account related information. For instance, the information selection tabs 508 can include a selectable icon for accessing account activity, accessing summaries of accounts, or accessing formal credit account statements. The user interface 500 can also include a detailed transaction listing 510. Overall, the user interface 500 provides an example application for communicating with the resource allocation server 110 (FIG. 1).

Figure 6:
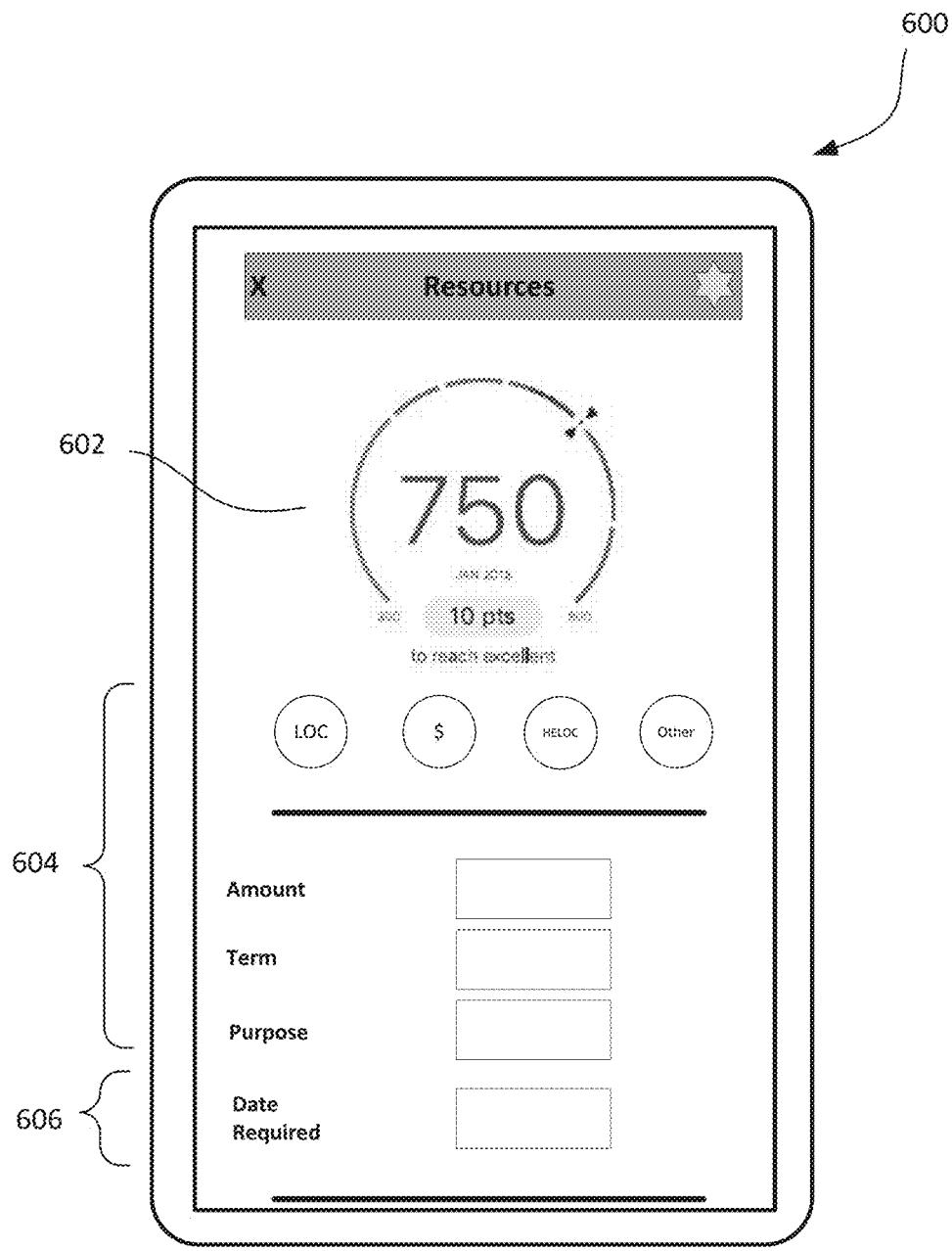
FIG. 6 illustrates a user interface for displaying an existing score indication, in accordance with an example of the present application.

Reference is made to FIG. 6, which diagrammatically illustrates a user interface 600 for displaying an existing score indication, in accordance with an example of the present application. The example user interface 600 illustrated in FIG. 6 may be provided for display at the client device 120 (FIG. 1) in response to receipt of an input at the score indication icon 506, which corresponds to operation 212 in FIG. 2. Further, the example user interface 600 may be provided for receiving input, such as the time parameter and action indicator, (described at operation 222 in FIG. 2) and transmitting the received input to the resource allocation server 110.

The user interface 600 includes an existing score indication 602. The example existing score indication 602 can be in the form of a dial meter interface and can include alphanumeric text for indicating the existing credit score associated with the banking client. In the illustrated example, the existing credit score is "750". The user interface 600 includes additional text providing additional information, such as the number of credit score points needed to reach an "excellent" rating. In some examples, displaying the existing score indication 602 at the client device 120 may be in response to operation 220 of FIG. 2.

The user interface 600 may include further selectable icons, such as action indicators 604, for receiving input (e.g., such as the action indicator input of operation 222 of FIG. 2) from a user of the client device 120. For example, the action indicators can represent requests for shared resource allocation. Examples of requests for shared resource allocation can include applications for credit card accounts, mortgage loans, line-of-credit accounts, or the like. Accordingly, the user interface 600 may provide a banking client with real-time or near real-time information regarding requests for shared resources.

As an illustrative example, the banking client may be at a new vehicle dealership shopping for a new vehicle. The banking client may be considering a vehicle finance loan offer offered by the vehicle dealership. Further, with access to the user interface 600, the banking client may also remotely inquire about a monetary loan from the banking institution operating the resource allocation server 110. The action indicators 604 can include graphical indicators associated with line-of-credit, cash-advance, or other shared resource options. Further, the action indicators 604 can include alphanumeric input for receiving additional details for a request for a shared resource allocation. For example, if the banking client selects a graphical icon for a line-of-credit, the user interface 600 can additionally receive request details, such as a line-of-credit amount, a loan term, and details regarding the purpose of the line-of-credit. Although the user interface 600 depicts the action indicators 604 as graphical icons or alphanumeric input text boxes, in some examples, the action indicators 604 can be provided in the form of drop-down selection menus or any other type of input method.

The user interface 600 can also include a time parameter input interface 606. In FIG. 6, the time parameter input interface 606 may be an alphanumeric text input interface; however, other input interface features are contemplated, such as selectable icons, slider bars, or the like. The time parameter input interface 606 may be used for receiving a future time or time range associated with the action indicator (e.g., which may be the time parameter from operation 222 of FIG. 2). The combination of the action indicator and time parameter inputs may summarize the banking client intention for requesting shared resources at a future time. For example, the user interface 600 may receive input from a banking client associated with action indicators 604 for a line-of-credit loan for $15,000 over a 48 month term for a new vehicle purchase. Further, the user interface 600 may receive input associated with a time parameter for a required date of 4 weeks from today. The user interface 600 be displayed by the notification application 122 (FIG. 1) may correspond to operation 222 described in FIG. 2.

Figure 7:
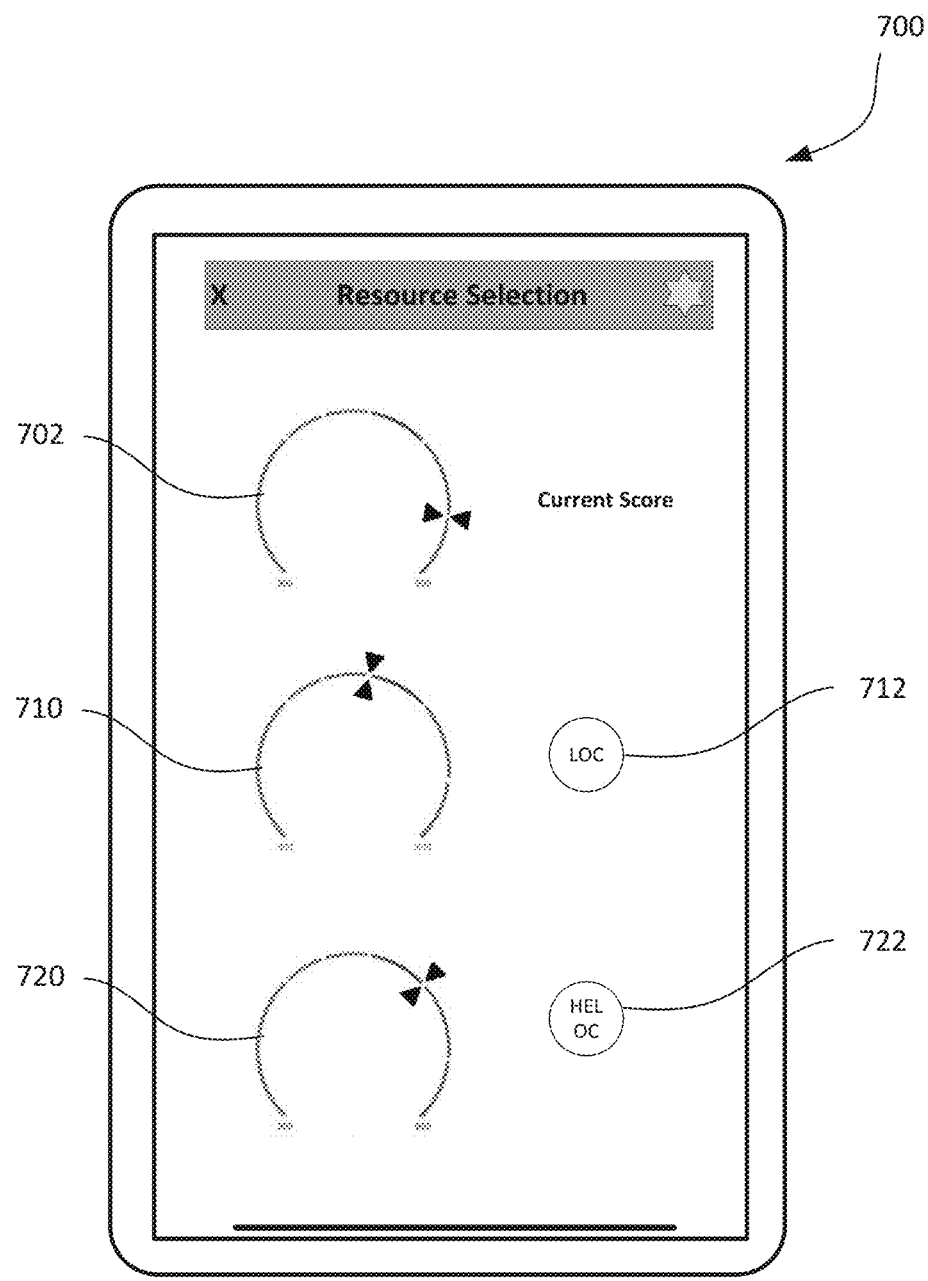
FIG. 7 illustrates a user interface for displaying a first provisional score indication and a selectable option for receiving input, in accordance with an example of the present application.

Reference is made to FIG. 7, which diagrammatically illustrates a user interface 700 for displaying a first provisional score indication 710 and a selectable option 712 for receiving input confirming the request for shared resource allocation. Further, the user interface 700 includes an existing score indication 702, similar to the existing score indication described with reference to FIG. 6. It can be appreciated that the user interface 700 can provide a user interface allowing visual comparison of score indications. In some examples, displaying the user interface 700 can correspond to operation 228 described with reference to FIG. 2.

Continuing with the above-described example, the selectable option 712 may be a graphical icon associated with a requested line-of-credit (LOC) described above in FIG. 6. Further, the first provisional score indication 710 may be determined by the resource allocation server 110 in response to receiving the time parameter input and the one or more action indicators in the example described above in FIG. 6. Accordingly, the selectable option 712 can receive input for confirming the request for the line-of-credit described above with reference to FIG. 6.

The user interface 700 further illustrates an alternate provisional score indication 720 and an alternate selectable option 722 associated with an alternate action indicator. For example, the alternate provisional score indication 720 may be the alternate provisional score at operation 410 described above with reference to FIG. 4 and the alternate action indicator can be associated, for example, with an existing resource. To illustrate, the existing resource can be an existing HELOC account suitable for providing shared resources (e.g., monetary funds) for purchasing the new vehicle described above. In some examples, displaying the alternate provisional score indication 720 and the alternate selectable option 722 can correspond to operation 430 described above with reference to FIG. 4.

In FIG. 7, the alternate provisional score indication 720 (e.g., associated with using existing HELOC account) displays a higher potential credit score than the potential credit score of the first provisional score indication 710. In the present example, utilizing the existing HELOC account may have less effect on the client's credit score than using a new line-of-credit account. By displaying the current existing score indication 702, the first provisional score indication 710, and the alternate provisional score indication 720, the user interface 700 can illustrate alternate shared resource options (e.g., drawing on HELOC account for purchasing new vehicle) that the banking client may not have considered. Thus, the user interface 700 can display alternate shared resource options that, if selected, could achieve a similar result (e.g., purchasing a new car) in a more favourable manner to the client (e.g., less impact to banking client credit score).

In some examples, the notification application 122 (FIG. 1) can include features of a mobile payment application. That is, the notification application 122 can include instructions that, when executed by a processor, cause the processor to confirm a payment at a point-of-sale terminal. In an example where the client device 120 receives input, via the user interface 700, via the selectable option 712 for confirming the request for the line-of-credit, the notification application 122 can subsequently provide a user interface (not illustrated) for receiving resource transfer instructions. For example, the client device 120 may include a near-field communications device and the notification application 122 can receive input containing instructions to allocate shared resources (e.g., from the line-of-credit) to a payee entity associated with another entity record 114 (FIG. 1) stored at the resource allocation server 110. The payee entity may be associated with the above-mentioned point-of-sale terminal.

Figure 8:
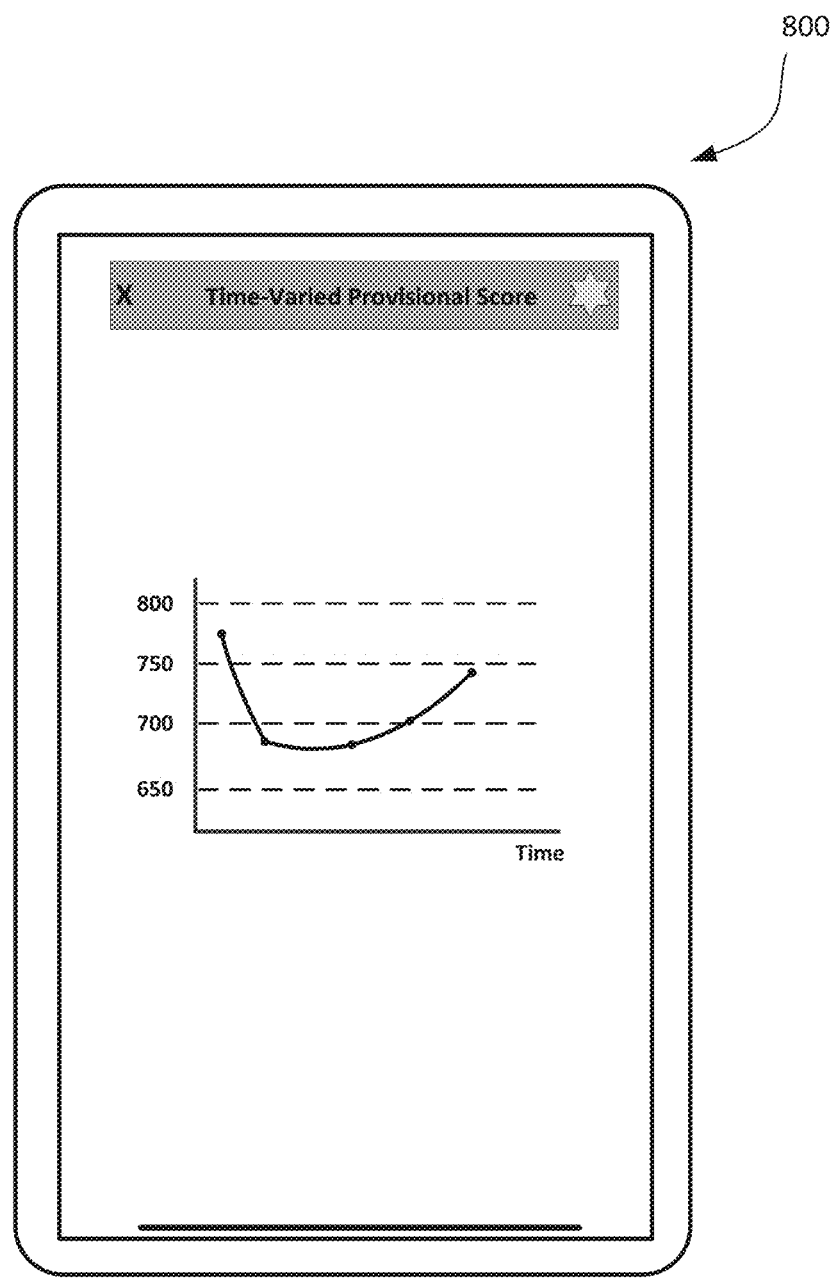
FIG. 8 illustrates a user interface for illustrating time-varied provisional scores, in accordance with an example of the present application.

Reference is made to FIG. 8, which diagrammatically illustrates a user interface 800 for illustrating time-varied provisional scores, in accordance with an example of the present application. As described, allocating a shared resource to a client device 120 today may result in a score that is different than another score resulting from allocating the same shared resource 9 months from today. Thus, FIG. 8 illustrates an example user interface 800 for illustrating alternate provisional scores corresponding to shared resource allocation at various future points in time. Accordingly, where a user of the client device 120 may be flexible on when shared resources may be required, the user interface 800 may illustrate a potential optimal date for requesting shared resources.

Referring again to FIG. 6, the example user interface 600 provides user interface features for receiving input corresponding to time parameter and action indicator details for a single contemplated resource allocation request. In some further examples, the user interface 600 can include features for receiving input for two or more contemplated resource allocation requests. In further examples, the resource allocation server 110 can determine whether the terms/conditions for a later resource allocation request may be affected by an earlier resource allocation request. For instance, the resource allocation server 110 can transmit to the client device 120 a user interface for illustrating simulated scores based on temporally spaced apart resource allocations. Accordingly, the resource allocation server 110 can provide a user interface for simulating scores with two or more contemplated requests for shared resource allocation as a whole, rather than considering contemplated requests for shared resource allocation individually.

Figure 9:
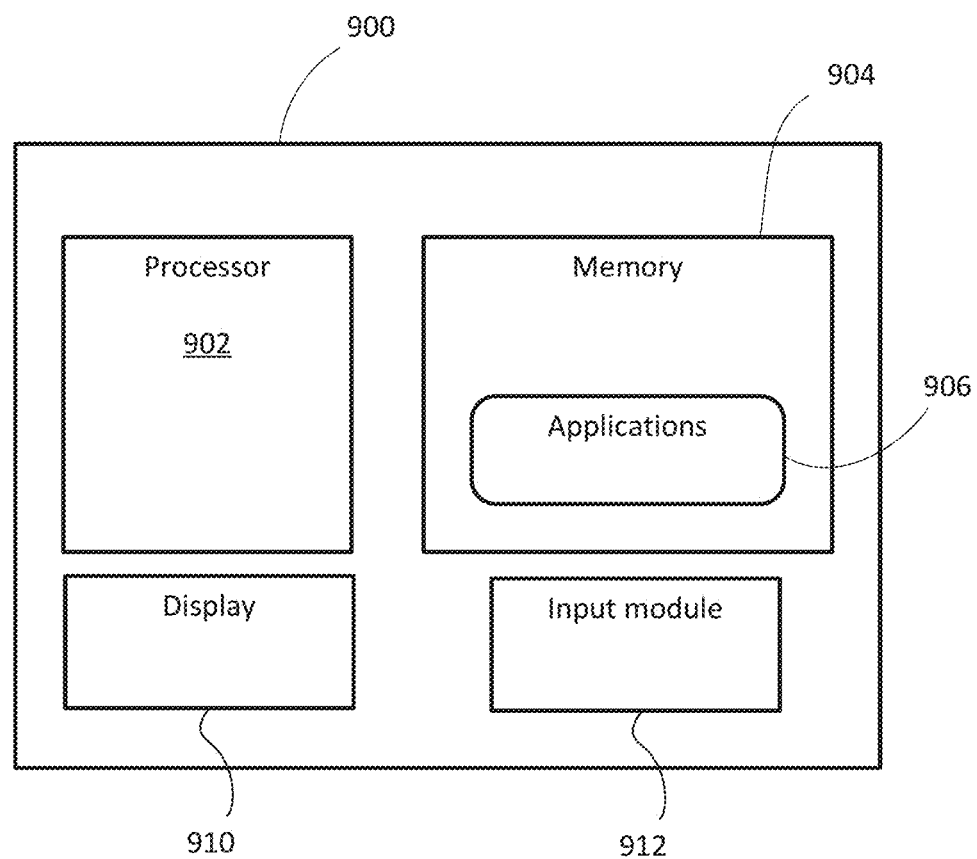
FIG. 9 illustrates, in simplified block diagram form, an electronic device, in accordance with an example of the present application.

Reference is made to FIG. 9, which illustrates, in simplified block diagram form, an electronic device 900, in accordance with an example of the present application. The electronic device 900 can be the client device 120 (FIG. 1). The electronic device 900 includes one or more processors 902, memory 904, and a communications module for providing network capabilities to communicate with other computing devices. The memory 904 can store processor-executable software applications 906 that include an operating system to provide basic device operations. The software applications 906 may also include instructions implementing operations of the methods described herein.

The electronic device 900 includes a display interface and/or a display 910. The display 910 can be any suitable display, such as a liquid crystal display (LCD), an e-ink/e-paper display, or the like. In some examples, the display 910 is a touchscreen display. The electronic device 900 includes an input module 912 for receiving signals representing commands described in examples herein. In some examples, the electronic device 900 is a portable electronic device, such as a smartphone, a personal computer, a personal digital assistant, a portable navigation device, a mobile phone, a wearable computing device (e.g., smart watch, wearable activity monitor, or the like), or any other type of computing device that may be configured to store data and software instructions, and execute software instructions to perform example operations described herein. The electronic device 900 may be associated with one or more users which may interact with the electronic device 900 using the input module 912. In some examples, the display 910 and the input module 912 may correspond to the input/output module 124 of FIG. 1. The user may operate the electronic device 900 by way of a provided graphical user interface whereby the electronic device 900 performs one or more operations consistent with the examples described herein.

Figure 10:
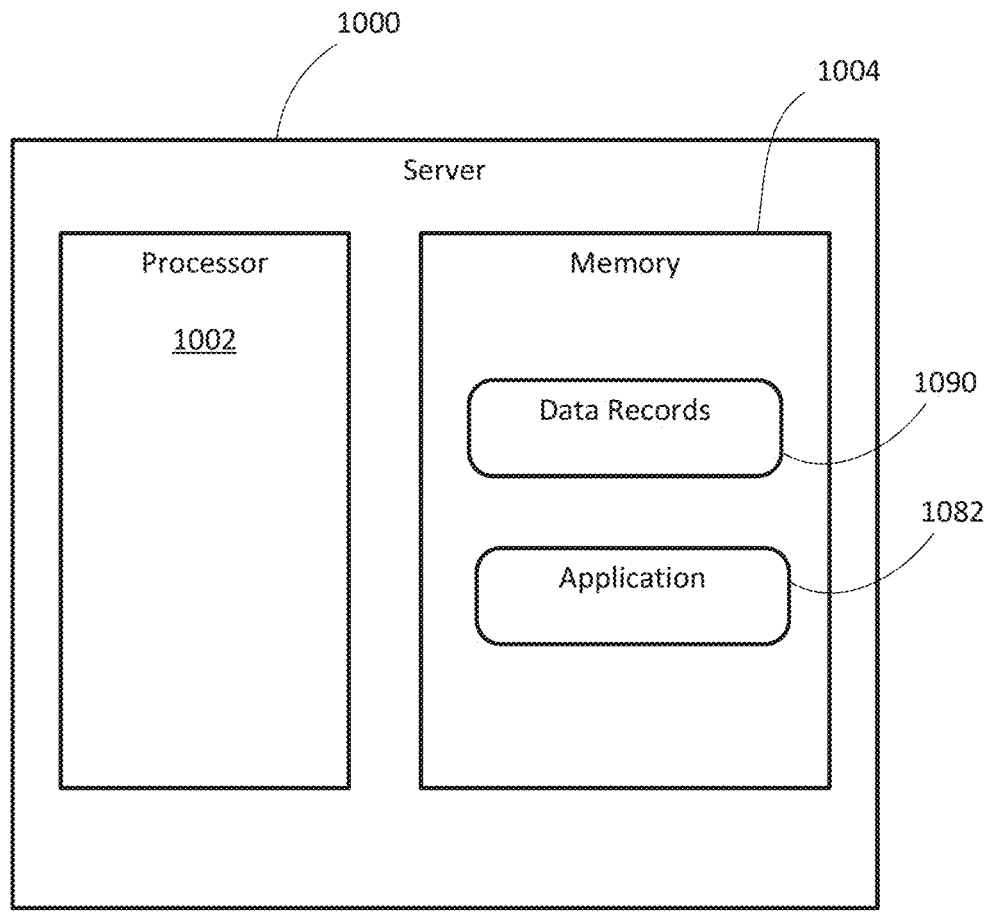
FIG. 10 illustrates, in simplified block diagram form, a server, in accordance with an example of the present application.

Reference is made to FIG. 10, which illustrates, in simplified block diagram form, a server 1000, in accordance with an example of the present application. The server 1000 may be the resource allocation server 110 or the data server 130 of FIG. 1. The server 1000 includes one or more processors 1002, memory 1004, and a communications module for providing network capabilities to communicate with other computing devices. The memory 1004 may include data records 1090, which can include the entity records 114 of FIG. 1. The memory can also include applications 1082 having instructions for performing the operations of the resource allocation server 110 or the data server 130, respectively. For example, the applications 1082 can include the allocation application 112 of the resource allocation server 110 or the scoring application 132 of the data server 130 in FIG. 1.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A system comprising:
a communication module;
a processor coupled to the communication module; and
a memory coupled to the processor, the memory storing at least one data record and instructions that, when executed, configure the processor to:
transmit, via the communication module to a notification application on a client device, an existing score indication corresponding to a data record for display at the client device, the data record corresponding to an identifier;
receive, via the communication module, an action indicator associated with a shared resource and, in response, determine a first provisional score corresponding to the data record based on the existing score indication and the action indicator to provide a first provisional score indication; and
transmit, via the communication module to the client device, the first provisional score indication and a selectable option associated with the action indicator for display at the client device while the first provisional score indication is displayed.

2. The system of claim 1, wherein the action indicator corresponds to at least one of requesting the shared resource and varying allocation of the shared resource.

3. The system of claim 1, wherein the instructions, when executed, further cause the processor to determine that the first provisional score is greater than a minimum threshold score and, in response, transmit the first provisional score indication and the selectable option associated with the action indicator for display at the client device.

4. The system of claim 1, wherein the instructions, when executed, further cause the processor to:
determine an alternate provisional score corresponding to the data record based on an alternate action indicator associated with an alternate shared resource and determine that the alternate provisional score is greater than the first provisional score; and
in response to determining that the alternate provisional score is greater than the first provisional score, transmit an alternate provisional score indication and an alternate selectable option associated with the alternate action indicator for display at the client device.

5. The system of claim 4, wherein the alternate shared resource is an existing shared resource associated with the data record.

6. The system of claim 1, wherein the instructions, when executed, further cause the processor to:
determine a time-varied provisional score at an alternate time that is different than a time associated with a first time parameter received via the communication module, wherein the alternate time is subsequent to the time associated with the first time parameter; and
transmit, via the communication module to the client device, a time-varied provisional score indication for display at the client device for comparison with the first provisional score.

7. The system of claim 1, wherein the identifier is a user identifier associated with a geographical region, and wherein the first provisional score is further based on aggregated score data associated with a plurality of other data records associated with the geographical region.

8. The system of claim 1, wherein the shared resource includes at least one of a cash-advance, a line-of-credit, a mortgage, a credit card, and digital assets.

9. The system of claim 1, wherein the existing score indication includes a credit score indication associated with the data record, and wherein the first provisional score indication includes a first provisional credit score indication associated with allocating the shared resource at a time indicated by a first time parameter received via the communication module.

10. The system of claim 1, wherein the client device includes a near-field communications device coupled to a client device processor, wherein the notification application on the client device is a mobile payment application, and wherein the client device includes memory storing instructions that, when executed, cause the client device processor to confirm a payment at a point-of-sale terminal.

11. A computer-implemented method comprising:
transmitting, via a communication module to a notification application on a client device, an existing score indication corresponding to a data record for display at the client device, the data record corresponding to an identifier;
receiving, via the communication module, an action indicator associated with a shared resource and, in response, determining a first provisional score corresponding to the data record based on the existing score indication and the action indicator to provide a first provisional score indication; and
transmitting, via the communication module to the client device, the first provisional score indication and a selectable option associated with the action indicator for display at the client device while the first provisional score indication is displayed.

12. The method of claim 11, wherein the action indicator corresponds to at least one of requesting the shared resource and varying allocation of the shared resource.

13. The method of claim 11, further comprising determining that the first provisional score is greater than a minimum threshold score and, in response, transmitting the first provisional score indication and the selectable option associated with the action indicator for display at the client device.

14. The method of claim 11, further comprising:
determining an alternate provisional score corresponding to the data record based on an alternate action indicator associated with an alternate shared resource and determining that the alternate provisional score is greater than the first provisional score; and
in response to determining that the alternate provisional score is greater than the first provisional score, transmitting an alternate provisional score indication and an alternate selectable option associated with the alternate action indicator for display at the client device.

15. The method of claim 14, wherein the alternate shared resource is an existing shared resource associated with the data record.

16. The method of claim 11, further comprising:
determining a time-varied provisional score at an alternate time that is different than a time associated with a first time parameter received via the communication module, wherein the alternate time is subsequent to the time associated with the first time parameter; and transmitting, via the communication module to the client device, a time-varied provisional score indication for display at the client device for comparison with the first provisional score.

17. The method of claim 11, wherein the identifier is a user identifier associated with a geographical region, and wherein the first provisional score is further based on aggregated score data associated with a plurality of other data records associated with the geographical region.

18. The method of claim 11, wherein the shared resource includes at least one of a cash-advance, a line-of-credit, a mortgage, a credit card, and digital assets.

19. The method of claim 11, wherein the existing score indication includes a credit score indication associated with the data record, and wherein the first provisional score indication includes a first provisional credit score indication associated with allocating the shared resource to the data record at a time indicated by a first time parameter received via the communication module.

20. A non-transitory computer-readable storage medium storing instructions, the instructions, when executed by a processor of a system, cause the system to:
- transmit, via a communication module to a notification application on a client device, an existing score indication corresponding to a data record for display at the client device, the data record corresponding to an identifier;
- receive, via the communication module, an action indicator associated with a shared resource and, in response, determine a first provisional score corresponding to the data record based on the existing score indication and the action indicator to provide a first provisional score indication;
- transmit, via the communication module to the client device, the first provisional score indication and a selectable option associated with the action indicator for display at the client device while the first provisional score indication is displayed.

\* \* \* \* \*